(12) United States Patent
Sharma et al.

(10) Patent No.: US 10,343,149 B2
(45) Date of Patent: Jul. 9, 2019

(54) PROCESS FOR PREPARING A CATALYST

(71) Applicant: Reliance Industries Limited, Mumbai (IN)

(72) Inventors: Nagesh Sharma, Vadodara (IN); Ajay Kumar, Vadodara (IN); Anilkumar Mettu, Guntur (IN); Veera Venkata Satya Bhaskara Sita Rama Murthy Katravulapalli, Hyderabad (IN); Kalpana Gopalakrishna, Akota Vadodara (IN); Raksh Vir Jasra, Vadodara (IN)

(73) Assignee: Reliance Industries Limited, Mumbai (IN)

( * ) Notice: Subject to any disclaimer, the term of this patent is extended or adjusted under 35 U.S.C. 154(b) by 109 days.

(21) Appl. No.: 15/121,905

(22) PCT Filed: Feb. 26, 2015

(86) PCT No.: PCT/IB2015/051423
§ 371 (c)(1),
(2) Date: Aug. 26, 2016

(87) PCT Pub. No.: WO2015/128822
PCT Pub. Date: Sep. 3, 2015

(65) Prior Publication Data
US 2017/0072387 A1  Mar. 16, 2017

(30) Foreign Application Priority Data
Feb. 28, 2014 (IN) .......................... 717/MUM/2014

(51) Int. Cl.
*B01J 29/06* (2006.01)
*B01J 29/068* (2006.01)
(Continued)

(52) U.S. Cl.
CPC .......... *B01J 29/068* (2013.01); *B01J 29/072* (2013.01); *B01J 29/076* (2013.01); *B01J 29/084* (2013.01); *B01J 29/088* (2013.01); *B01J 29/126* (2013.01); *B01J 29/146* (2013.01); *B01J 29/18* (2013.01); *B01J 29/185* (2013.01); *B01J 29/22* (2013.01); *B01J 29/24* (2013.01); *B01J 29/26* (2013.01); *B01J 29/40* (2013.01); *B01J 29/405* (2013.01); *B01J 29/42* (2013.01); *B01J 29/44* (2013.01); *B01J 29/46* (2013.01); *B01J 29/48* (2013.01); *B01J 29/7007* (2013.01); *B01J 29/7034* (2013.01); *B01J 29/7038* (2013.01); *B01J 29/7057* (2013.01); *B01J 29/7415* (2013.01); *B01J 29/7469* (2013.01); *B01J 29/7615* (2013.01); *B01J 29/7669* (2013.01); *B01J 29/7815* (2013.01); *B01J 29/7869* (2013.01); *B01J 35/0006* (2013.01); *B01J 37/0215* (2013.01); *B01J 37/0236* (2013.01); *B01J 37/0242* (2013.01); *B01J 37/0246* (2013.01); *B01J 37/06* (2013.01); *B01J 37/08* (2013.01); *C10G 35/09* (2013.01); *C10G 35/095* (2013.01); *B01J 35/023* (2013.01); *B01J 2229/186* (2013.01); *B01J 2229/64* (2013.01)

(58) Field of Classification Search
CPC ........ B01J 29/088; B01J 29/126; B01J 29/44; B01J 29/48; B01J 29/068; B01J 29/7034; B01J 29/7007; B01J 29/185; B01J 29/22; B01J 29/24; B01J 29/26; B01J 29/084; B01J 29/076; B01J 29/072; B01J 29/7038; B01J 29/7615; B01J 29/7669; B01J 29/7815; B01J 29/7869; B01J 29/405; B01J 29/46; B01J 29/146; B01J 29/7057; B01J 29/7415; B01J 29/7469; B01J 2229/186; B01J 2229/64; B01J 35/0006; B01J 37/0236; B01J 37/06; B01J 37/08; B01J 37/0246; B01J 37/0215
USPC ........... 502/4, 64, 66, 69, 71, 74, 77, 78, 79
See application file for complete search history.

(56) References Cited

U.S. PATENT DOCUMENTS 2,834,740 A   5/1958  Johnson et al.
3,856,661 A  12/1974  Sugier et al.
(Continued)

OTHER PUBLICATIONS

Jiao et al., "Controllable synthesis of ZSM-5 coatings on SiC foam support for NTP application", Microporous and Mesoporous Materials, 162, 2012, pp. 152-158.*
Yan et al., "Preparation of Zeolite ZSM-5 Membranes by In-Situ Crystallization on Porous alpha-Al2O3". Ind. Eng. Chem. Res. 1995, 34(5), pp. 1652-1661.*

*Primary Examiner* — Elizabeth D Wood
(74) *Attorney, Agent, or Firm* — Fish IP Law, LLP

(57) ABSTRACT

The present disclosure relates to a process for preparing a catalyst. The process comprises coating zeolite gel over the alumina support to obtain a chloride free zeolite gel coated alumina support, crystallizing the chloride free zeolite gel coated alumina support, washing, drying and calcining the crystallized zeolite coated alumina support to obtain a calcined crystallized chloride free zeolite coated alumina support, treating the calcined crystallized chloride free zeolite coated alumina support with ammonium nitrate to obtain sodium free support, washing, drying, and calcining the support to obtain a calcined chloride free zeolite coated alumina support, immersing the calcined chloride free zeolite coated alumina support in an active metal and a promoter metal solution mixture followed by stirring to obtain a metal coated chloride free zeolite coated alumina support, and drying and calcining the metal coated chloride free zeolite coated alumina support to obtain the catalyst.

7 Claims, No Drawings

(51) Int. Cl.

| | |
|---|---|
| *B01J 29/12* | (2006.01) |
| *B01J 29/08* | (2006.01) |
| *B01J 29/22* | (2006.01) |
| *B01J 29/24* | (2006.01) |
| *B01J 29/26* | (2006.01) |
| *B01J 29/76* | (2006.01) |
| *B01J 29/78* | (2006.01) |
| *B01J 29/18* | (2006.01) |
| *B01J 29/14* | (2006.01) |
| *B01J 29/40* | (2006.01) |
| *B01J 29/46* | (2006.01) |
| *B01J 29/70* | (2006.01) |
| *B01J 29/74* | (2006.01) |
| *B01J 35/00* | (2006.01) |
| *B01J 37/02* | (2006.01) |
| *C10G 35/09* | (2006.01) |
| *C10G 35/095* | (2006.01) |
| *B01J 29/44* | (2006.01) |
| *B01J 29/48* | (2006.01) |
| *B01J 29/42* | (2006.01) |
| *B01J 37/06* | (2006.01) |
| *B01J 37/08* | (2006.01) |
| *B01J 29/072* | (2006.01) |
| *B01J 29/076* | (2006.01) |
| *B01J 35/02* | (2006.01) |

(56) References Cited

U.S. PATENT DOCUMENTS

| | | | | |
|---|---|---|---|---|
| 4,435,608 | A * | 3/1984 | Koetsier | B01J 29/86 585/480 |
| 5,077,253 | A * | 12/1991 | Chu | B01J 33/00 502/61 |
| 5,516,740 | A * | 5/1996 | Cody | B01J 23/42 502/202 |
| 6,177,381 | B1 * | 1/2001 | Jensen | B01J 23/40 428/403 |
| 6,936,561 | B2 * | 8/2005 | Marques | B01D 53/885 502/60 |
| 7,425,660 | B2 * | 9/2008 | Larson | B01J 29/076 585/481 |
| 2007/0249881 | A1 * | 10/2007 | Larson | B01J 29/076 585/477 |
| 2008/0314798 | A1 * | 12/2008 | Stockwell | B01J 21/16 208/118 |
| 2010/0075832 | A1 | 3/2010 | Stockwell et al. | |
| 2011/0040013 | A1 * | 2/2011 | Tsapatsis | B01D 69/148 524/430 |
| 2011/0217221 | A1 * | 9/2011 | Thogersen | B01D 53/9418 423/239.2 |
| 2012/0230910 | A1 * | 9/2012 | Choi | B01J 20/18 423/701 |
| 2014/0256538 | A1 * | 9/2014 | Yoon | C01B 37/02 502/67 |

\* cited by examiner

PROCESS FOR PREPARING A CATALYST

FIELD OF THE DISCLOSURE

The present disclosure relates to a process for preparing a catalyst. The present disclosure envisages a process for preparation of a catalyst to be used typically in reforming of naphtha during crude refining process.

DEFINITIONS

An active metal is a Group VIII metal of the modern periodic table. The Group VIII metals are platinum (Pt), palladium (Pd) and nickel (Ni).

A promoter metal is a Group IV metal of the modern periodic table. The Group IV metals are tin (Sn), rhenium (Re) and iridium (Ir).

ZSM-5 is an aluminosilicate zeolite belonging to the pentasil family of zeolites and its chemical formula is $Na_nAl_nSi_{96-n}O_{192} \cdot 16\ H_2O$ ($0<n<27$).

Mordenite is a zeolite mineral with the chemical formula $Al_2Si_{10}O_{24} \cdot 7\ H_2O$.

Ultra-stable Y (USY) zeolite is a form of type Y zeolite with the majority of sodium ions removed and treated thermally to enhance its thermal and steam stability.

H-beta zeolite is a high-silica content zeolite having full three dimensional 12-ring pore system.

MCM-22 is a type of zeolite having unique phase and good crystallinity.

ZSM-12 is a type of pentasil zeolite having silica to alumina ratio above 33.

BACKGROUND

Catalytic naphtha reforming is an important industrial process. During the naphtha reforming process, mainly low-octane straight chain alkanes (paraffins), with 6-10 carbon atoms, are reformed into molecules having straight chain alkanes, branched alkanes (isoparaffins) and cyclic naphthenes, which are then partially dehydrogenated to produce high-octane aromatic hydrocarbons such as benzene, toluene and xylenes (BTX) in the reformate. The naphtha feedstock used for catalytic reforming contains naphthenic hydrocarbons, paraffinic hydrocarbons and aromatic hydrocarbons of different carbon numbers. The major reactions in naphtha reforming process include dehydrogenation of naphthenes, dehydrocyclization of paraffins, isomerization of paraffins and hydrocracking. The chemical reactions in reforming process occur in presence of a catalyst and a high partial pressure of hydrogen. The catalysts used for reforming process are usually bifunctional in nature (i.e. having metal function and the acidic function). In a typical reforming process, naphtha is processed over the conventional acidic reforming catalysts where, one or more dehydrogenation metals, i.e. noble metals with stabilizing metal ions are supported on chlorided $Al_2O_3$. These conventional reforming catalysts comprises platinum alone or along with Re, Ir, Sn or Ge as a promoter metals on gamma alumina support. However, it is observed that reforming of naphtha in the presence of conventional catalysts results in undesired gaseous products.

Further, the gamma alumina support of the conventional reforming catalysts consists of corrosive and non-eco-friendly ingredients such as chloride that provides required acidity essential for the process. However, the activity of the conventional catalysts decreases due to the formation and accumulation of coke on the catalyst surface and sintering of metals on the catalyst surface during the reforming process.

In the conventional reforming process, the C8 aromatic isomers formed i.e., ethyl benzene (EB), para-xylenes (p-X), meta-xylenes (m-X), and ortho-xylenes (o-X) appear in thermodynamic equilibrium in the product. Generally, the ethyl benzene formed during the conventional reforming takes an idle ride in the post reforming downstream p-xylene recovery unit, thus occupying unit capacity and leading to undesired operating cost.

Therefore, there is a need of a catalyst which reduces the formation of ethylbenzene in the product. Further, there is a need of a catalyst that overcomes the drawbacks associated with the conventional catalyst.

OBJECTS

Some of the objects of the present disclosure, which at least one embodiment herein satisfies, are as follows:

It is an object of the present disclosure to provide a process for preparing a catalyst used for a naphtha reforming process.

It is another object of the present disclosure to improve the selectivity of products during the naphtha reforming process.

It is still another object of the present disclosure to provide a process for the preparation of catalyst which is chloride free therefore non-corrosive.

It is yet another object of the present disclosure to provide a process for the preparation of simple, eco-friendly catalyst with significant stability.

It is still another object of the present disclosure to ameliorate one or more problems associated with the conventional catalyst or at least provide a useful alternative.

Other objects and advantages of the present disclosure will be more apparent from the following description which is not intended to limit the scope of the present disclosure.

SUMMARY

The present disclosure provides a process for preparing a catalyst.

The process comprises:
i. providing alumina support;
ii. coating zeolite gel over the alumina support to obtain a chloride free zeolite gel coated alumina support;
iii. crystallizing the chloride free zeolite gel coated alumina support to obtain a crystallized zeolite coated alumina support;
iv. washing, drying and calcining the crystallized zeolite coated alumina support to obtain a calcined crystallized chloride free zeolite coated alumina support;
v. treating the calcined crystallized chloride free zeolite coated alumina support with ammonium nitrate to obtain sodium free support; and
vi. washing, drying, and calcining the support to obtain a calcined chloride free zeolite coated alumina support;
vii. immersing the calcined chloride free zeolite coated alumina support in an active metal and a promoter metal solution mixture followed by stirring to obtain a metal coated chloride free zeolite coated alumina support; and
viii. drying and calcining the metal coated chloride free zeolite coated alumina support to obtain the catalyst.

The zeolite is at least one selected from a group consisting of ZSM-5, mordenite, USY, H-Beta, MCM-22, and ZSM-12.

DETAILED DESCRIPTION

The present disclosure provides a process for preparing a catalyst. The catalyst of the present disclosure is used for reforming of naphtha.

The process proceeds comprising the following steps:

In the first step, alumina support is provided.

In the second step, a chloride free zeolite gel coated alumina support is obtained by coating zeolite gel over the alumina support.

In the third step, a crystallized zeolite coated alumina support is obtained by crystallizing the chloride free zeolite gel coated alumina support.

In the fourth step, a calcined crystallized chloride free zeolite coated alumina support is obtained by washing, drying and calcining the crystallized zeolite coated alumina support.

In the fifth step, sodium free support is obtained by treating the calcined crystallized chloride free zeolite coated alumina support with ammonium nitrate.

In the sixth step, a calcined chloride free zeolite coated alumina support is obtained by washing, drying, and calcining the support.

In the seventh step, a metal coated chloride free zeolite coated alumina support is obtained by immersing the calcined chloride free zeolite coated alumina support in an active metal and a promoter metal solution mixture followed by stiffing.

In the eight step, the catalyst is obtained by drying and calcining the metal coated chloride free zeolite coated alumina support.

In accordance with the present disclosure, the calcined crystallized zeolite coated alumina support (obtained in the fourth step) is treated with ammonium nitrate to make the calcined crystallized zeolite coated alumina support sodium (Na) ion free. It is essential to make the calcined crystallized zeolite coated alumina support Na ion free because the Na ion on the reforming catalyst generates basicity, which is detrimental to the catalyst performance Further, the cracking of hydrocarbons requires proton to generate required acidic function on the zeolite, hence Na ion is exchanged by ammonium ion, which is eliminated during calcination leaving behind proton on the zeolite.

In accordance with one embodiment, the crystallization step (in the third step) is carried out in a temperature range of 150° C. to 250° C., more preferably 150° C. to 170° C., and for a time period ranging from 2 days to 8 days, preferably from 3 days to 6 days under autogenous pressure.

In accordance with one embodiment, the drying step (in the fourth step) is carried out in an oven in a temperature range of 100° C. to 200° C., more preferably at 100° C. to 120° C.

In accordance with one embodiment, the calcination step (in the fourth step) is carried out in a furnace in a temperature range of 500° C. to 600° C., more preferably between 500° C. to 550° C., and for a time period ranging from 2 hours to 10 hours, more preferably between 4 hours to 7 hours.

In accordance with one embodiment, the drying step (in the sixth step) is carried out in an oven in a temperature range of 100° C. to 200° C., more preferably between 100° C. to 120° C., and for a time period ranging from 10 hours to 20 hours, more preferably 10 hours to 15 hours.

In accordance with one embodiment, the calcination step (in the sixth step) is carried out in a furnace in a temperature range of 500° C. to 650° C., more preferably between 500° C. to 550° C., and for a time period ranging from 4 hours to 10 hours, more preferably for 5 hours to 7 hours.

In accordance with one embodiment, the drying step (in the eight step) is carried out in an oven in a temperature range of 100° C. to 200° C. for a time period ranging from 10 hours to 20 hours.

In accordance with one embodiment, the calcination step (in the eight step) is carried out in a furnace in a temperature range of 500° C. to 600° C. for a time period ranging from 5 hours to 10 hours.

Examples of the Group VIII metals include platinum (Pt), palladium (Pd) and nickel (Ni).

In accordance with one embodiment, the Group VIII is platinum (Pt).

The precursor of platinum (Pt) is at least one selected from a group consisting of Diamine-dinitro palatinate II, Hexachloroplatinic acid, Platinum acetylacetonate, Platinum Nitrate, Tetrammineplatinum (II) chloride, and Platinum (IV) chloride.

In accordance with one embodiment, the precursor of platinum (Pt) is Hexachloroplatinic acid.

Examples of the Group IV metals include tin (Sn), rhenium (Re) and Iridium (Ir).

In accordance with one embodiment, the Group IV metal is tin (Sn).

The precursor of tin (Sn) is at least one selected from a group consisting of tetra-butyl tin, tin (IV) chloride, and tin (II) chloride.

In accordance with one embodiment, the precursor of tin (Sn) is tin (II) chloride.

In accordance with one embodiment, the zeolite gel is prepared by,
  i. forming a first mixture by dissolving $NaAlO_2$ in deionized water followed by stiffing;
  ii. forming a second mixture by adding tetraethyl orthosilicate to the first mixture followed by stiffing; and
  iii. forming the zeolite gel by adding tetra-propyl-ammonium hydroxide drop-wise to the second mixture followed by stiffing.

Examples of the zeolite include ZSM-5, mordenite, USY, H-Beta, MCM-22, and ZSM-12.

In accordance with one embodiment, the zeolite is ZSM-5 comprising $SiO_2$ and $Al_2O_3$ and the ratio of $SiO_2$ to $Al_2O_3$ in the ZSM-5 catalyst ranges from 10:1 to 20:1.

In accordance with another embodiment, the ratio of $SiO_2$ to $Al_2O_3$ in the ZSM-5 is 15:1.

The catalyst prepared by the process of the present disclosure comprises a chloride free zeolite coated alumina support impregnated with 0.01 wt % to 0.5 wt % active metal and 0.01 wt % to 0.5 wt % promoter metal, wherein the thickness of the zeolite coating on the chloride free alumina support ranges from 100 μm to 200 μm.

The present disclosure is further illustrated herein below with the help of the following examples. The examples used herein are intended merely to facilitate an understanding of the ways in which the embodiments herein may be practiced and to further enable those of skilled in the art to practice the embodiments herein. Accordingly, the examples should not be construed as limiting the scope of the embodiments herein.

The following examples illustrate the process for preparing the catalyst:

EXAMPLE 1

Process for Preparing the Catalyst

The zeolite gel is coated over the alumina ($Al_2O_3$) support to obtain a chloride free zeolite gel coated alumina support.

The chloride free zeolite gel coated alumina support was transferred into a Teflon coated stainless steel autoclave (100 ml) and crystallized at 170° C. for 5 days under autogenous pressure to obtain a crystallized chloride free zeolite coated alumina support. After 5 days of crystallization, the crystallized chloride free zeolite coated alumina support was filtered, washed with distilled water, dried in an oven at 110° C., and then calcined in air at 540° C. for 6 hours to obtain a calcined crystallized chloride free zeolite coated alumina support. The calcined crystallized chloride free zeolite coated alumina support was treated with 0.1 M ammonium nitrate. Three cycles of ion exchange were performed at 80° C. for 3 hours to obtain sodium free support. After 3 cycles of ion-exchange, the support was washed with deionized (DI) water. Further, the support was dried at 120° C. for 12 hours and then it was calcined at 540° C. for 6 hours to obtain a calcined chloride free zeolite coated alumina support.

At least a portion of Hexachloroplatinic acid (having concentration ranging from 18.13 mg/ml to 19.03 mg/ml) and at least a portion of Tin chloride (having concentration ranging from 115.04 mg/ml to 120 mg/ml) were mixed in a beaker to form a metal solution mixture. The metal solution mixture was diluted to 1:5 ratio (solid to liquid by weight) and approximately 0.24 ml of concentrated Hydrochloric acid per gram of the calcined chloride free zeolite coated alumina support was added in the metal solution mixture to form a dark red color solution and avoid the precipitation of metal chloride solutions. The calcined chloride free zeolite coated alumina support was immersed in the metal solution mixture for 12 hours at a room temperature followed by stirring to obtain a metal ion impregnated chloride free zeolite coated alumina support. The excess solution from the metal ion impregnated chloride free zeolite coated alumina support was removed by a rotavapor method at 50° C. under 50 rpm speed followed by drying in an oven at 120° C. for 12 hours and calcining in a furnace at 540° C. for 6 hours to obtain the catalyst comprising chloride free zeolite coated alumina support impregnated with 0.01 wt % to 0.5 wt % platinum (Pt) and 0.01 wt % to 0.5 wt % tin (Sn).

EXAMPLE 2

Process for Preparing the Zeolite Gel 0.458 of NaAlO2 (55% Al2O3, 45% Na$_2$O) was dissolved in 60 ml of deionized water at a room temperature while stiffing to form a first mixture. 19.2 g of tetraethyl ortho-silicate (TEOS, 98%) was added to the first mixture at a room temperature while stiffing for 30 minutes to form a second mixture. 11.3 g of tetra-propyl-ammonium hydroxide (1 M TPAOH) was added in a drop-wise manner to the second mixture at a room temperature while stiffing for 1 hour at a room temperature to form the zeolite gel.

In accordance with the present disclosure, the catalyst prepared by the afore-mentioned process is used for improving the selectivity and the yield of desired hydrocarbons including desired aromatic compounds.

The catalyst prepared from the process of the present disclosure provides an optimum acidity to the catalyst which results into less naphtha chain cracking during the reforming process. Further, the selectivity and the yield of desired hydrocarbons including desired aromatic compounds are improved.

TECHNICAL ADVANCEMENT

The present disclosure provides the process for preparing the catalyst. The technical advancements offered by the process including the catalyst of the present disclosure are as follows:
the coating of zeolite on alumina support of the catalyst does not contain chloride;
the catalyst has optimum acidity which results into less chain cracking and reduced coke formation during the reforming process.
the selectivity of desired hydrocarbons is improved; and the yield of desired aromatic compounds is improved.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

The invention claimed is:
1. A process for preparing a catalyst for naphtha reforming, said process comprising the following steps:
   a) providing a chloride free alumina support;
   b) coating zeolite gel over the chloride free alumina support to obtain a zeolite gel coated chloride free alumina support, wherein said zeolite has molar ratio of $SiO_2$ to $Al_2O_3$ ranging from 10:1 to 20:1;
   wherein said zeolite gel is prepared by
   i. dissolving $NaAlO_2$ in deionized water followed by stirring to form a first mixture;
   ii. adding tetraethyl ortho-silicate to said first mixture followed by stirring to form a second mixture; and
   iii. adding tetra-propylammonium hydroxide drop-wise to said second mixture followed by stirring to form said zeolite gel,
   c) crystallizing the zeolite gel coated chloride free alumina support to obtain a crystallized zeolite coated chloride free alumina support;
   d) washing, drying and calcining the crystallized zeolite coated chloride free alumina support to obtain a calcined crystallized zeolite coated chloride free alumina support;
   e) treating the calcined crystallized zeolite coated chloride free alumina support with ammonium nitrate to obtain sodium free support;
   f) washing, drying, and calcining the support to obtain a calcined zeolite coated chloride free alumina support,
   g) immersing the calcined zeolite coated chloride free alumina support in an active metal and a promoter metal solution mixture followed by stirring to obtain a metal coated zeolite coated chloride free alumina support; and h) drying and calcining the metal coated zeolite coated chloride free alumina support to obtain the catalyst.

2. The process as claimed in claim 1, wherein said active metal and promoter metal solution mixture is prepared by,
   i) preparing an active metal solution by using at least one precursor of an active metal, wherein said active metal is a Group VIII metal;
   ii) preparing a promoter metal solution by using at least one precursor of a promoter metal, wherein said promoter metal is a Group IV metal; and
   iii) mixing the active metal solution and the promoter metal solution to form said active metal and promoter metal solution mixture.

3. The process as claimed in claim 1, wherein
   i. crystallization step (c) is carried out in a temperature range of 150° C. to 250° C. for a time period ranging from 2 days to 8 days under autogenous pressure;
   ii. drying step (d) is carried out in an oven in a temperature range of 100° C. to 200° C.;
   iii. calcination step(d) is carried out in a furnace in a temperature range of 500° C. to 600° C. for a time period ranging from 2 hours to 10 hours;
   iv. drying step (f) is carried out in an oven in a temperature range of 100° C. to 200° C. for a time period ranging from 10 hours to 20 hours; and
   v. calcination step (f) is carried out in a furnace in a temperature range of 500° C. to 650° C. for a time period ranging from 4 hours to 10 hours.

4. The process as claimed in claim 1, wherein said drying step (h) is carried out in an oven in a temperature range of 100° C. to 200° C. for a time period ranging from 10 hours to 20 hours.

5. The process as claimed in claim 1, wherein said calcining step (h) is carried out in a furnace in a temperature range of 500° C. to 600° C. for a time period ranging from 5 hours to 20 hours.

6. The process as claimed in claim 1, wherein said precursor of active metal is at least one selected from a group consisting of Diamine-dinitro platinate II, Hexachloroplatinic acid, Platinum acetylacetonate, Platinum Nitrate, Tetrammineplatinum (II) chloride, and Platinum (IV) chloride.

7. The process as claimed in claim 1, wherein said precursor of promoter metal is at least one selected from a group consisting of tetra butyl tin, tin (IV) chloride, and tin (II) chloride.

* * * * *